United States Patent
Haas

[15] 3,658,548
[45] Apr. 25, 1972

[54] ANIMAL FOOD PRODUCTS
[72] Inventor: Gerhard J. Haas, Woodcliff Lake, N.J.
[73] Assignee: General Foods Corporation, White Plains, N.Y.
[22] Filed: June 2, 1969
[21] Appl. No.: 829,720

[52] U.S. Cl. ..........................................99/2 R, 99/7, 99/157
[51] Int. Cl. ..........................................A23k 3/00, A23k 1/10
[58] Field of Search....................99/224, 150, 2, 7, 157, 158; 424/317

[56] References Cited

UNITED STATES PATENTS

| | | | |
|---|---|---|---|
| 3,202,514 | 8/1965 | Burgess et al. | 99/2 |
| 3,510,317 | 5/1970 | Fernholz | 99/150 |
| 2,772,262 | 11/1956 | Yeager | 260/102 |
| 2,841,526 | 7/1958 | Gustus | 424/317 |

OTHER PUBLICATIONS

T. Kosuge et al., Chemical Abstracts, Vol. 70, 1969, p. 228, article 60760c, " Antifungal Constituents of Rice-Brantar"

Primary Examiner—Norman Yudkoff
Assistant Examiner—Curtis P. Ribando
Attorney—Thomas V. Sullivan, Bruno P. Struzzi and Jerome J. Norris

[57] ABSTRACT

This invention relates to the use of caproic and caprylic acids as antimycotics or preservatives to preserve meat and meat-like animal foods which are characterized by high degrees of palatability, nutrition and caloric value.

8 Claims, No Drawings

ANIMAL FOOD PRODUCTS

BACKGROUND OF THE INVENTION

The concept of intermediate moisture animal food products is set forth in U.S. Pat. No. 3,202,514; these products usually have a moisture content in excess of 10 percent and substantially below 75 percent. In general, any significant elevation of the moisture level of many foods above 10 percent will increase their palatability, however, it leads to microbiological decomposition unless the food products are packaged in a hermetically sealed container and commercially sterilized or maintained in a frozen or refrigerated state throughout the period of distribution and storage by the consumer.

One method of preventing microbiological decomposition in foods having moisture in excess of 10 percent is by employing the principle of limiting the amount of unbound water capable of supporting microbiological spoilage. This principle is disclosed in U.S. Pat. No. 3,202,514 and is known as the Aw, or the ability of the soluble solids in the food to limit the amount of "free" water available to bacteria: the bacteria's inability to survive this condition; and the subsequent shelf stability or product stability obtained by virtue of this condition.

Since shelf or product stability is the result of having substantially totally inhibited harmful mold growth as well as bacteriological growth, it has been necessary to incorporate antimycotics such as potassium sorbate in intermediate moisture foods to prevent mold development and ultimate shelf instability. However, two objectionable aspects are attendant in the use of potassium sorbate as the antimycotic; namely, its high cost and its tendency to lessen the palatability of animal foods to dogs.

SUMMARY OF THE INVENTION

It has now been found that caproic and caprylic acids, which occur naturally in some cheeses and soy sauces, but not in meats, may be employed in non-intermediate moisture and intermediate moisture meat or meat-product animal food as effectively as similar proportions of potassium sorbate, to prevent mold growth.

Certain levels of these acids incorporated in animal foods eliminates: (1) the problems of the high cost of employing potassium sorbate in proportions sufficient to totally inhibit mold growth in meat or meat-product animal foods (0.3 percent by weight); (2) the reduced palatability to dogs of animal foods containing 0.3 percent by weight of potassium sorbate; and (3) is just as effective as potassium sorbate alone in preventing mold growth.

The types of antimycotics permitted in animal foods are few, and the characteristics and activities of these materials in moist systems have been adequately described in textbooks. However, little information is available on the activity of these antimycotics and preservatives in systems of lower moisture, where the reduced water activity has an inhibiting action per se on microorganisms.

The relative weight percent of water soluble solids to the moisture content of the animal food, when initially incorporated into the animal food during its manufacture and preparatory to packaging determines the ultimate functionality of the solids in providing the requisite bacteriostatic effect. Usually the level of moisture will range from 15 to 30 percent. The level of water soluble solids (principally sugar) may be varied as may the level of moisture incorporated within the desired ranges. However, in varying these levels the relationship of the water soluble solids in solution to the water should be controlled so as to afford the desired osmotic pressure. A good rule to observe in this connection is to be sure that the water soluble solids available for solution are at least equal to the weight of moisture present, although in some cases it is possible that a lower level of water soluble solids might afford some protection against microbiological decomposition provided an equivalent degree of osmotic pressure is available to protect the product.

In performing tests to determine the effect of levulinic acid alone, and in combination with potassium sorbate, on non-intermediate moisture and intermediate moisture meat and meat-product animal foods, a system was developed which would maintain most of the characteristics of reduced water meat and meat-product animal foods and at the same time accelerate mold growth to such an extent that useful results could be obtained by inspection for visual growth of generic microorganisms such as Aspergilli and Pennicillia, within weeks.

To judge the degree of inhibition, the tests were carried out at 23° C. and 33° C. The samples were inspected daily and the number of days for visible mold formation determined. In the effectiveness scale, 0 represents no extension of shelf life or extension for less than double the control which contained no antimicrobial or antimycotic; 1 is double to triple the shelf life; 2 is triple to quadruple the shelf life; 3 is quadruple to tenfold the shelf life; 4 is at least tenfold the shelf life; and 5 signifies complete inhibition for approximately 6 months at both storage temperatures.

The following example will more specifically set forth the preferred embodiment of the invention:

EXAMPLE I

Meat-Product Animal Food

| Ingredients | Parts by Weight |
|---|---|
| Chopped meat by-products (tripe, udders, cheek trimmings, tongue trimmings, gullets, etc.) | 32.0 |
| Defatted soy flakes | 31.0 |
| Sucrose | 24.0 |
| Flaked soy bean hulls | 3.0 |
| Dicalcium phosphate | 3.0 |
| Dried non-fat milk solids | 2.5 |
| Bleachable fancy tallow | 1.0 |
| Mono- and di-glycerides | 1.0 |
| Sodium chloride | 1.0 |
| FD & C red dye | 0.006 |
| Garlic | 0.2 |
| Vitamin and mineral premix | 0.06 |

An intimate mixture of the foregoing ingredients was made by first chopping the meat by-products into small pieces, which were then heated in combination with tallow to 212° F. to effect pasteurization and produce a liquefied slurried meat composition. The aforesaid slurry was then finely ground into a more or less pulpy, pumpable, flowable puree consistency. This hot pureed form of slurry was then proportionately blended with the remaining dry ingredients of the formulation in a steam jacketed cooker wherein it remained for a period of approximately 1½ minutes at an elevated temperature of about 200° F., the product being under continuous agitation throughout this cooking phase. This cooked mixture had a plastic, extrudable, shape-retaining consistency. The moisture content of this composition was 25.0 percent. The finely comminuted meat by-products and the soya flakes had the aqueous phase evenly distributed throughout, thereby assuring a maximum bacteriological protection to the final product.

The pasteurized mixture was immediately cooled by passage through a refrigerated heat exchanger to an ambient temperature.

The samples used in the test are a blend of one-half of a meat-product animal food and one-half of a 45 percent sucrose solution; however, without potassium sorbate or any other antimycotic. A sucrose solution is used because the liquid phase of the meat-product animal food is a solution, where most of the solute is sucrose. The sample was divided into 6 parts and antimycotics were mixed thoroughly into each for one minute at medium speed, and half the paste of each sample was transferred to jars and stored at room temperature (about 23° C.) and 33° C. The results of these tests appear in Table I.

TABLE I

| Antimycotic | Percentage tested | Degree of inhibition at top level | Level for total inhibition |
|---|---|---|---|
| Potassium sorbate | 0.1; 0.3 | 5 | 0.3 |
| Caproic acid | 0.1; 0.2 | 5 | 0.2 |
| Caprylic acid | 0.1; 0.3 | 5 | 0.3 |

TABLE II

| Antimycotic | Days of first visible mold growth | |
|---|---|---|
|  | 23° C. storage | 33° C. storage |
| None | 7 days | 4 days |
| Potassium sorbate 0.1% | 15 days | 7 days |
| Potassium sorbate 0.3% | >70 days | >70 days |
| Caproic acid 0.2 % | >70 days | >70 days |
| Caprylic acid 0.3% | >70 days | >70 days |

Inasmuch as the step of diluting the meat-product animal food in half with 45 percent sucrose solution results in increased Aw, any antimycotic which is active under these more stringent conditions of Aw and temperature could be expected to be considerably more effective in undiluted meat-product animal foods having a low Aw; and such was the case.

EXAMPLE II

Same as Example I, except that the 45 percent sucrose solution was omitted. In this example the water soluble sugar solids was maintained between 15 to 35 percent by weight of the composition, and the weight level of water soluble solids is at least equal to or greater than that of the moisture of the composition; said moisture weight range being from 15 to 30 percent of the composition.

TABLE III

| Antimycotic | Days of first visible mold growth | |
|---|---|---|
|  | 23° C. storage | 33° C. storage |
| Potassium sorbate 0.3% | >170 days | >170 days |
| Caproic acid 0.2% | >170 days | >170 days |
| Caprylic acid 0.3% | >170 days | >170 days |

The intermediate moisture samples employed in Example II had a moisture content between 22 to 23.5 percent. In Table III of Example II, it can readily be seen that the relationship between the moisture content of the intermediate moisture meat-product animal food employing the various antimycotics, and the speed of visible contamination could not be determined up to 170 days; after which the experiment was terminated.

The results of Example I indicate that the use of caproic and caprylic acids in non-intermediate moisture meat-product animal foods is as effective as similar proportions of potassium sorbate in preventing mold growth.

While the invention discloses and describes the use of caproic and caprylic acids alone as being just as effective as potassium sorbate in inhibiting mold growth, it is to be understood that any and all combinations of caproic acid, caprylic acid, and potassium sorbate may be employed in the invention at levels effective to prevent mold growth.

Although the formulations of the invention have been described herein on animal or pet food varieties, the benefits of micro-organic stabilization herein presented will likewise be applicable to conventional human foods and intermediate moisture human foods having a bacteriostatic or stabilizing quantity of water soluble solutes. Among the intermediate moisture human foods which will be so stabilized are sausage-like formulations, liquid preparations such as syrup, simulated cheeses and egg products, French toast, pancake and waffle products and the like. These foods may be aerobically packed in a non-hermetic wrapper such as cellophane, whereupon such packaged products can be stored without refrigeration for periods of 3 to 6 months or longer.

Even though the invention has been described with reference to specific examples, it will be obvious to those skilled in the art that various other embodiments can be practiced within the scope of the invention without departing from the same.

I claim:

1. A meat based moist animal food composition comprising a matrix of proteinaceous meaty materials having an aqueous solution of water soluble solids incorporated in said matrix materials; the moisture level in said composition being between 15 to 30 percent by weight, and the level of water soluble solids being at least equal to the weight of moisture in the composition; said composition having caproic acid at a level of 0.2 percent by weight of the animal food composition to prevent mold growth.

2. A meat based moist animal food composition comprising a matrix of proteinaceous meaty materials having an aqueous solution of water soluble solids incorporated in said matrix materials; the moisture level in said composition being between 15 to 30 percent by weight, and the level of water soluble solids being at least equal to the weight of moisture in the composition; said composition having caprylic acid at a level of 0.3 percent by weight of the animal food composition to prevent mold growth.

3. A meat based moist animal food composition comprising a matrix of proteinaceous meaty materials having an aqueous solution of water soluble solids incorporated in said matrix materials; said composition having caproic acid at a level of 0.2 percent by weight of the animal food composition to prevent mold growth.

4. A meat based moist animal food composition comprising a matrix of proteinaceous meaty materials having an aqueous solution of water soluble solids incorporated in said matrix materials; said composition having caprylic acid at a level of 0.3 percent by weight of the animal food composition to prevent mold growth.

5. A method of stabilizing meat based animal food compositions comprising a matrix of proteinaceous meaty materials having an aqueous solution of water soluble solids incorporated in said matrix materials; the moisture level in said composition being between 15 to 30 percent by weight, and the level of water soluble solids being at least equal to the weight of moisture in the composition; comprising incorporating caproic acid at a level of 0.2 percent by weight of the animal food composition to prevent mold growth.

6. A method of stabilizing meat based moist animal food compositions comprising a matrix of proteinaceous meaty materials having an aqueous solution of water soluble solids incorporated in said matrix materials; the moisture level in said composition being between 15 to 30 percent by weight, and the level of water soluble solids being at least equal to the weight of moisture in the composition; comprising incorporating caprylic acid at a level of 0.3 percent by weight of the animal food composition to prevent mold growth.

7. A method of stabilizing meat based moist animal food compositions comprising a matrix of proteinaceous meaty materials having an aqueous solution of water soluble solids incorporated in said matrix materials; comprising incorporating caproic acid at a level of 0.2 percent by weight of the animal food composition to prevent mold growth.

8. A method of stabilizing meat based moist animal food compositions comprising a matrix of proteinaceous meaty materials having an aqueous solution of water soluble solids incorporated in said matrix materials; comprising incorporating caprylic acid at a level of 0.3 percent by weight of the animal food composition to prevent mold growth.

* * * * *

UNITED STATES PATENT OFFICE
CERTIFICATE OF CORRECTION

Patent No. 3,658,548          Dated April 25, 1972

Inventor(s) Gerhard J. Haas

It is certified that error appears in the above-identified patent and that said Letters Patent are hereby corrected as shown below:

Delete Claims 1 - 8 (all of the claims now appearing in the printed patent specification) and substitute therefor the following claims:

1. A meat based moist animal food composition consisting of a matrix of a slurry of finely ground proteinaceous pasteurized meat by-products selected from the group consisting of tripe, udders, cheek trimmings, tongue trimmings, gullets, and mixtures thereof, having an aqueous solution of water soluble sugar solids incorporated in said matrix of meat by-products, and minor amounts of vitamins, minerals, flavors, and coloring and texturizing food ingredients; the moisture level in said composition being between 15% to 30% by weight, and the level of water soluble sugar solids being at least equal to the weight of moisture in the composition; said composition having caproic acid at a level of 0.2 percent by weight of the animal food composition to prevent mold growth.

UNITED STATES PATENT OFFICE
CERTIFICATE OF CORRECTION

Patent No. 3,658,548            Dated April 25, 1972

Inventor(s) Gerhard J. Haas

It is certified that error appears in the above-identified patent and that said Letters Patent are hereby corrected as shown below:

2. A meat based moist animal food composition consisting of a matrix of a slurry of finely ground proteinaceous pasteurized meat by-products selected from the group consisting of tripe, udders, cheek trimmings, tongue trimmings, gullets, and mixtures thereof, having an aqueous solution of water soluble sugar solids incorporated in said matrix of meat by-products, and minor amounts of vitamins, minerals, flavors, and coloring and texturizing food ingredients; the moisture level in said composition being between 15% to 30% by weight, and the level of water soluble sugar solids being at least equal to the weight of moisture in the composition; said composition having caprylic acid at a level of 0.3% by weight of the animal food composition to prevent mold growth.

UNITED STATES PATENT OFFICE
CERTIFICATE OF CORRECTION

Patent No. 3,658,548     Dated April 25, 1972

Inventor(s) Gerhard J. Haas

It is certified that error appears in the above-identified patent and that said Letters Patent are hereby corrected as shown below:

3. A method of stabilizing meat based moist animal food compositions consisting of a matrix of a slurry of finely ground proteinaceous pasteurized meat by-products selected from the group consisting of tripe, udders, cheek trimmings, tongue trimmings, gullets, and mixtures thereof, having an aqueous solution of water soluble sugar solids incorporated in said matrix of meat by-products, and minor amounts of vitamins, minerals, flavors, and coloring and texturizing food ingredients; the moisture level in said composition being between 15% to 30% by weight, and the level of water soluble sugar solids being at least equal to the weight of moisture in the composition; said composition having caproic acid at a level of 0.2% by weight of the animal food composition to prevent mold growth.

UNITED STATES PATENT OFFICE
CERTIFICATE OF CORRECTION

Patent No. 3,658,548        Dated April 25, 1972

Inventor(s) Gerhard J. Haas

It is certified that error appears in the above-identified patent and that said Letters Patent are hereby corrected as shown below:

4. A method of stabilizing meat based moist animal food compositions consisting of a matrix of a slurry of finely ground proteinaceous pasteurized meat by-products selected from the group consisting of tripe, udders, cheek trimmings, tongue trimmings, gullets, and mixtures thereof, having an aqueous solution of water soluble sugar solids incorporated in said matrix of meat by-products, and minor amounts of vitamins, minerals, flavors, and coloring and texturizing food ingredients; the moisture level in said composition being between 15% to 30% by weight, and the level of water soluble sugar solids being at least equal to the weight of moisture in the composition; said composition having caprylic acid at a level of 0.3% by weight of the animal food composition to prevent mold growth.

Signed and sealed this 27th day of February 1973.

(SEAL)
Attest:

EDWARD M. FLETCHER, JR.         ROBERT GOTTSCHALK
Attesting Officer        Commissioner of Patents